United States Patent
Hwang et al.

(10) Patent No.: US 8,288,057 B2
(45) Date of Patent: Oct. 16, 2012

(54) ELECTRODE LAYER OF FUEL CELL AND METHOD OF FABRICATING THE SAME

(75) Inventors: Bing-Joe Hwang, Taipei (TW); Kai-Tzu Cheng, Taichung (TW)

(73) Assignee: National Taiwan University of Science and Technology, Taipei (TW)

( * ) Notice: Subject to any disclaimer, the term of this patent is extended or adjusted under 35 U.S.C. 154(b) by 723 days.

(21) Appl. No.: 12/405,017

(22) Filed: Mar. 16, 2009

(65) Prior Publication Data

US 2010/0233570 A1    Sep. 16, 2010

(51) Int. Cl.
  *H01M 4/02* (2006.01)
  *H01M 4/36* (2006.01)
(52) U.S. Cl. ....................................................... 429/523
(58) Field of Classification Search .................. None
  See application file for complete search history.

(56) References Cited

U.S. PATENT DOCUMENTS

2003/0134739 A1* 7/2003 Cox et al. .......................... 502/4
2006/0204831 A1* 9/2006 Yan et al. ......................... 429/42

FOREIGN PATENT DOCUMENTS

CN    1591940    3/2005

OTHER PUBLICATIONS

"Office Action of China Counterpart Application", issued on Sep. 23, 2011, p. 1-p. 4, in which the listed reference was cited.

* cited by examiner

*Primary Examiner* — Emily Le
*Assistant Examiner* — Michael Forrest
(74) *Attorney, Agent, or Firm* — J.C. Patents

(57) ABSTRACT

An electrode of an electrochemical cell and a method for fabricating the same is provided. The electrode is prepared by depositing ionomers to the catalyst layer of an electronic conductive layer, e.g. catalysts-coated carbon cloths. The ionomers are controllably deposited into the catalyst layer by applying a voltage. As a result, ionic conduction is enhanced and the reaction area of the three-phase-boundary region is increased.

18 Claims, 5 Drawing Sheets

ELECTRODE LAYER OF FUEL CELL AND METHOD OF FABRICATING THE SAME

BACKGROUND OF THE INVENTION

1. Field of Invention

The present invention relates to an electrode of an electrochemical cell, in particular a fuel cell, and a method of fabricating the same. Moreover, the present invention relates to an electrode having ionic channels constructed with ionomers and a method of fabricating the same.

2. Description of Related Art

Fuel cell technologies have been explored as a viable alternative of energy sources for at least the reasons that they produce less emission than the carbon-based fuels. A fuel cell is a device that converts chemical energy directly into electrical energy. Basically, a fuel cell works by separating electrons and protons of a reactant fuel and forcing the electrons to travel through a circuit to produce electrical power. Hence, a fuel cell has a higher efficiency than the ordinary internal combustion engines by bypassing the intermediate conversions to thermal energy and mechanical energy before the energy is transformed into electricity. There are many types of fuel cell, which are usually classified by the electrolyte employed in the cell or the operating temperature of the fuel cell. For example, there are the Alkaline Fuel Cell (AFC), the Proton Exchange Membrane (PEM) Fuel Cell, the Direct Methanol Fuel Cell (MDFC), the Phosphoric Acid Fuel Cell (PAFC), the Molten Carbonate Fuel Cell (MCFC) and the Solid Oxide Fuel Cell (SOFC).

The basic structure of all fuel cells is similar. The cell typically consists of two electrodes (an anode and a cathode) that are separated by an electrolyte and are connected to an external circuit. The electrodes are exposed to gas (e.g. hydrogen or oxygen) or liquid flows in which reactions occur to create a potential difference across the cell. For example, in a PEM fuel cell, the pressurized hydrogen gas enters through the anode side of the fuel cell. At the catalyst on the anode, the hydrogen molecule splits into two hydrogen ions ($H^+$) and two electrons ($e^-$). The hydrogen ions travel to the cathode through the electrolyte, and the electrons travel through the external circuit. The electrolyte in a PEM fuel cell is a proton exchange membrane which conducts only positively charged ions and blocks electrons. At the cathode, oxygen molecules dissociate and accept the electrons from the external circuit. The hydrogen and oxygen ions then combine to form water.

The main requirement of a good electrode for an electrochemical cell is to provide large three-phase-boundary region among the reactant molecules, the catalyst particles with continuous electronic pathway and the ionic conductor for ensuring both good electronic and ionic conduction and the redox reaction of reactant molecules. The three-phase-boundary region is typically formed by the catalyst particles, the ionomeric binders and the reactants in the porous support structure. Electronic conductivity is provided by the carbon support which the catalyst particles are supported on, while ionic conductivity is provided by the ionomeric binders.

In order to expedite electrochemical reactions for improving the performance of an electrochemical device, in particularly a fuel cell, ionic and electronic conductions must be facilitated. Further, catalysts are usually formed with expensive noble metals, such as platinum, which is one of the major expenses for fuel cells. Hence, it is also important to improve catalytic efficiency.

SUMMARY OF THE INVENTION

The present invention is to provide an electrode for an electrochemical cell, in particularly a fuel cell, and a method for fabricating the same, wherein the reaction area of the three-phase-boundary is increased and catalyst efficiency is improved.

The present invention is to provide an electrode for an electrochemical cell, in particularly a fuel cell, and a method for fabricating the same, wherein the electrode includes a continuous ionic conduction pathway for enhancing ionic conduction.

The present invention is also to provide an electrode for an electrochemical cell, in particularly a fuel cell, and a method for fabricating the same, wherein a homo-junction is formed between the electrode and the electrolyte membrane, and hence, interfacial resistance in the membrane electrode assembly (MEA) is mitigated.

According to an aspect of the invention, an electrode for an electrochemical cell, in particularly for a fuel cell, is provided, wherein the electrode includes at least a catalyst layer on a porous backing layer, for example a diffusion layer. The electrode also includes continuous ionic channels constituted with ionomers deposited onto the catalyst layer.

In accordance to this aspect of the invention, the deposited ionomers form a continuous ionic conduction pathway along the depth of the catalyst layer.

In accordance to this aspect of the invention, the porous backing layer includes a carbon-based material or a metal-based material.

In accordance to this aspect of the invention, the catalyst layer comprises noble metals.

In accordance to this aspect of the invention, a charge transfer resistance ($R_{ct}$) of an electrochemical cell, in particularly a fuel cell, is reduced.

In accordance to this aspect of the invention, a sum of an electrode resistance and an interface resistance ($R_m + R_{interface}$) of an electrochemical cell, in particularly a fuel cell, is reduced.

In accordance to this aspect of the invention, the ionomers are, for example, Nafion® ionomers.

In accordance to this aspect of the invention, the type of the ionomers is applicable in forming an ionic conductive electrolyte membrane.

According to an aspect of the invention, a method for fabricating an electrode of an electrochemical cell, in particularly a fuel cell is provided, wherein the method includes providing a catalyst-coated electronic conductive layer in between a working and a counter electrode in an ionomer-containing solution, a voltage is then applied between the working electrode and the counter electrode. Consequently, ionomers are deposited onto the catalyst-coated electronic conductive layer.

In accordance to this aspect of the invention, the deposition is conducted using a dual-chamber apparatus.

According to the electrode of an electrochemical cell, in particularly a fuel cell, and a method for fabricating the same of the invention, the ionomers can be deposited, in a controlled manner, into a pre-determined depth of the catalyst layer. Hence, the reaction area of the three-phase-boundary region is increased and catalytic efficiency is enhanced. Moreover, the deposited ionomers formed ionic channels to provide an ionic conduction pathway, which can expedite ion conduction and improve the overall fuel cell efficiency. Further, via the developed deposition method, the ionomers are uniformly deposited onto the surface of the catalyst layer. Accordingly, a homo-junction is formed between the electrode and the electrolyte membrane to substantially mitigate the interfacial resistance.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Although fuel cells are emerging as an alternate energy source, the cost is still too high for a widespread use of the technology. In order for a commercial breakthrough to occur, it is important to bring down the cost and to improve the performance of the components in the cells. The metal catalyst embedded in the electrode for facilitating the electrochemical reaction is normally very expensive and contributes substantially to the high manufacturing cost of the fuel cells. Hence, it is imperative to provide an electrode with high catalytic efficiency. Further, a main requirement of a good electrode is to have large three-phase-boundary region at which the electrochemical reaction occurs. Accordingly, it is also imperative to provide an electrode in which ionic conduction and electronic conduction are expedited. The present invention is to provide an electrode and a method for fabricating the same, wherein the ionic conduction is enhanced by forming a continuous ion channels on the catalysts of the electrode, while the contact resistance between the electrode and the electrolyte membrane is decreased. Further, in accordance to the electrode and the method for producing the same of the invention, the reaction surface area of the three-phase-boundary region is increased and catalytic efficiency is enhanced.

For better understanding of the present invention, the following embodiments of the present invention will be described with respect to a Proton Exchange Membrane (PEM) fuel cell. However, it should be appreciated that the present invention should not be limited to a PEM fuel cell and the present invention is applicable to other cells with porous electrode, such as DMFC, sensors, or other electrochemical devices.

In accordance to the present invention, the electrode of a fuel cell is specially prepared by depositing ionomers onto the catalysts of the electrode, and the ionomers are deposited by applying a voltage in the ionomer-contained solution. According to the invention, the ionomers are controllably introduced into the catalyst layer to enhance the three-phase-boundary region of the catalysts, and to increase the catalytic efficiency. Further, the ionomers deposited into the catalyst layer provide a continuous ionic pathway. Hence, the ionic conduction is enhanced. Moreover, the contact resistance between the electrode and the electrolyte membrane is improved. In this embodiment of the invention, the deposited ionomers are Nafion® (sulfonated tetrafluorethylene copolymer) ionomers, for example. However, it should appreciated that other types of ionomers may be used in accordance to the present invention, for example, the material of the ionomers is the same as that of the electrolyte membrane of a fuel cell.

Figure 1:
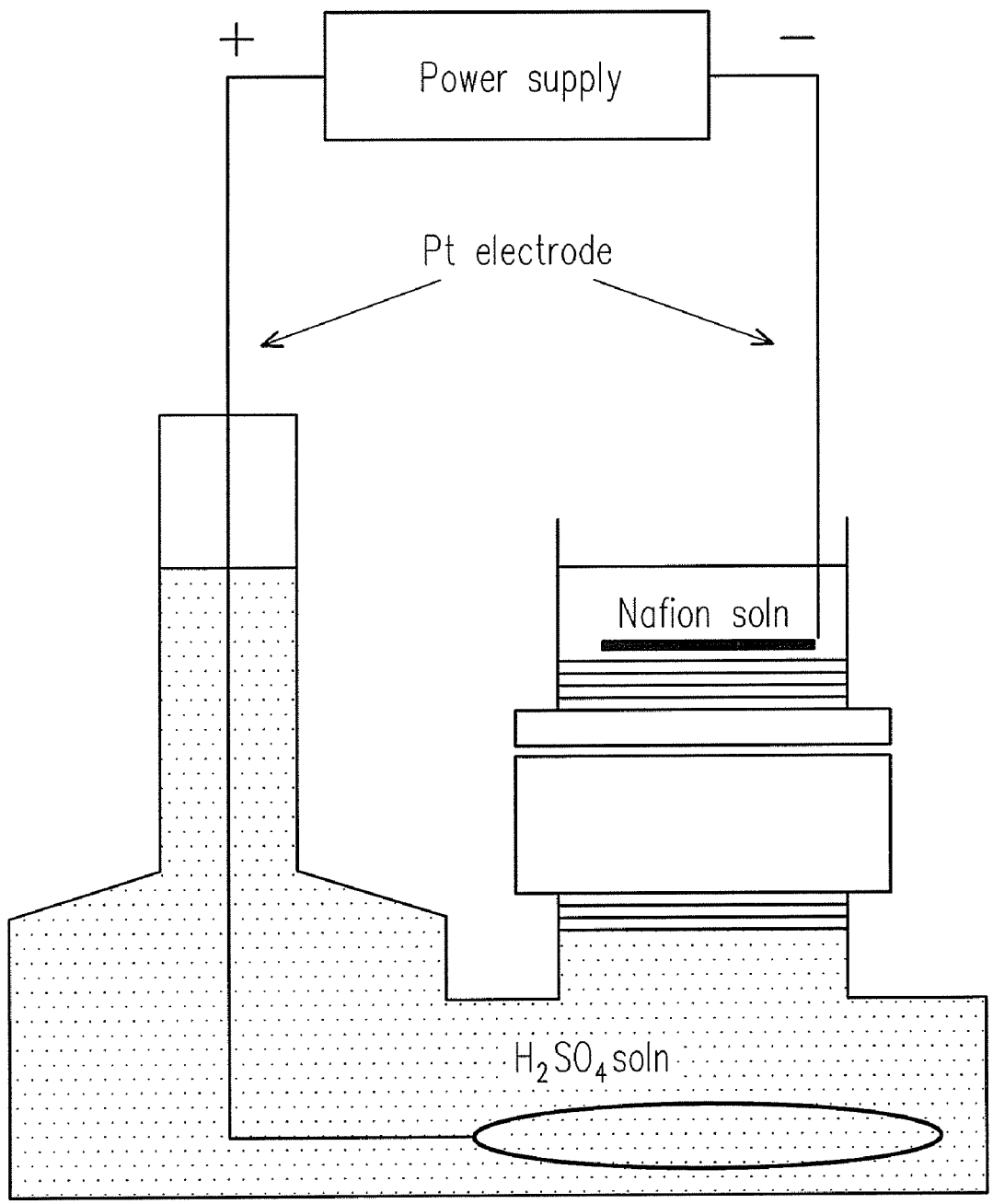
FIG. 1 is a schematic illustration of a dual-chamber deposition apparatus of the present invention.

The apparatus used in the invention is shown in FIG. 1. As shown, the apparatus of the invention includes two chambers, wherein the first chamber contains a sulfuric acid ($H_2SO_4$) solution, while the second chamber contains an aqueous solution of Nafion® ionomers. A carbon cloth or carbon paper, the previous mentioned electrode, is placed in between the two chambers with the catalyst-coated surface facing to the chamber containing an aqueous solution of Nafion® ionomers. Two Pt electrodes are used as cathode and anode for applying voltages to the apparatus. In this invention, the moving species are the negatively charged Nafion® molecules, which the hydrogen ions are dissociated from the sulfonic groups of the Nafion® molecules in the aqueous solution. Under the applied electric field, the negatively charged Nafion® ionomers migrate from the cathode to the anode, and are interrupted by the carbon cloth/paper in between, followed by deposition onto catalyst-coated surface of the carbon cloth/paper.

Figure 2:
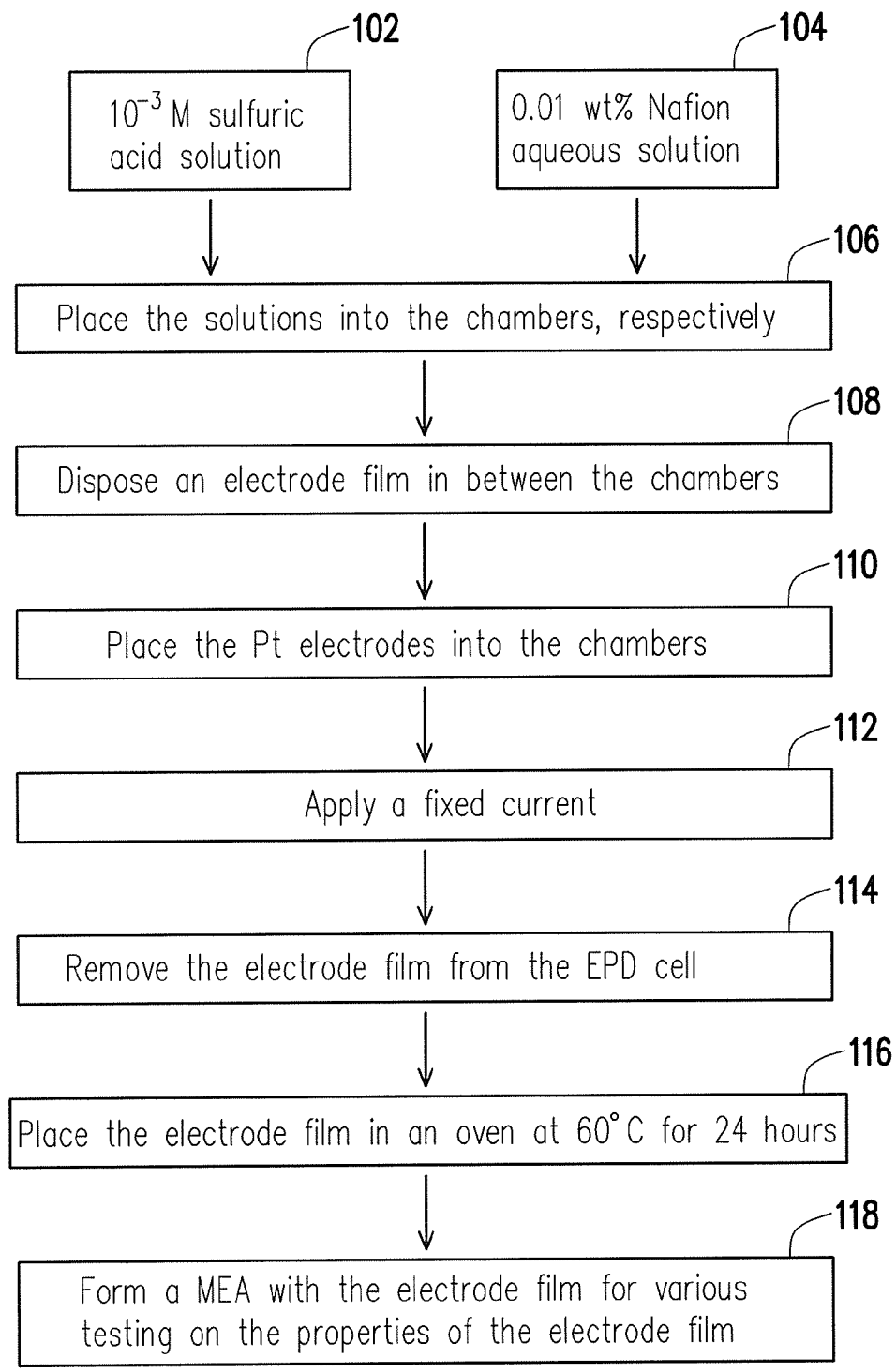
FIG. 2 is a flow chart of steps in exemplary processes that may be used in the fabrication of an electrode of a fuel cell according to an embodiment of the present invention.

FIG. 2 is a flow chart of the exemplary processes that may be used in the fabrication of an electrode of a fuel cell according to an embodiment of the present invention.

As shown in FIG. 2, in steps 102 to 106, $10^{-3}$ M sulfuric acid solution and 0.01 wt % Nafion® aqueous solution are prepared and are respectively placed into the first and second chambers of the dual-chamber apparatus of the invention. To provide a steady condition during the deposition process, the two solutions are maintained at a relatively constant temperature of about 30° C. and the Nafion® aqueous solution is mixed constantly. A catalyst-coated carbon cloth/carbon paper is disposed between the two chambers in step 108. A catalyst-coated carbon cloth/carbon paper, for example, for a PEM cell, is commonly prepared by mixing catalyst powders comprising nano-sized active particles (for example, platinum or platinum based alloys) with water and/or isopropanol to form a suspension, and spraying or coating the suspension onto a porous backing layer, for example, a gas diffusion layer, to form an electrode, surface-coated with a catalyst layer. The catalyst layer has a thickness dimension. The gas diffusion layer is, for example, carbon cloth or carbon paper. Electronic conductivity is necessary for the gas diffusion layer. After being treated at high temperature, the electrode with the catalyst-coated surface layer is soaked in an ionomeric binder solution, for example, a Nafion® solution, and the soaked electrode is transferred subsequently to a vacuum dry process. The catalyst powders may be commercially provided by E-Tek®, for example, 20% Pt on Valcan XC-72. In another embodiment, other type of electrode may also be used, for example, carbon paper containing about 4 mg/cm² of catalyst particles as used in the Direct Methanol Fuel Cell (DMFC).

In step 110, two Pt (platinum) electrodes are placed in the two chambers, in which one electrode serves as a working electrode and another electrode serves as a counter electrode. The Pt electrodes are connected to a power supply for providing a fixed current of about 1-20 mA to the cell as shown in step 112. In this embodiment of the invention, a fixed current of 1 mA, 5 mA, 10 mA or 20 mA is provided, for example, and the deposition is conducted for a fixed time period, for example, 15 minutes, 30 minutes, 60 minutes or 180 minutes. The change of voltage during the deposition process is also monitored. After the deposition is completed, the electrode is removed from the apparatus in step 114 and is placed in an oven at about 60° C. for 24 hours as in step 116. Thereafter, a membrane electrode assembly (MEA) is prepared using the electrode obtained above. For example, two electrodes with the deposition of the Nafion® ionomers by the method of this invention are placed on two sides of a Nafion® thin film and hot-pressed to form a membrane electrode assembly (MEA), and the characteristics of the resulting MEA are then evaluated as in step 118 according to the various deposition conditions.

Figure 3:
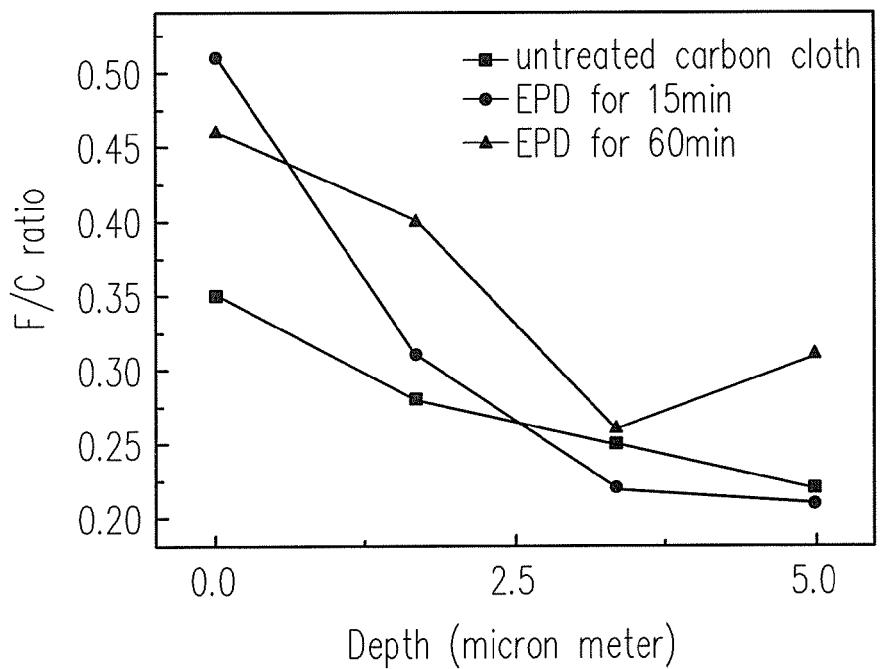
FIG. 3 is a graph showing the F/C ratios determined at various depths of the carbon cloth.

In a series of experiments, the deposition time period varies, while other conditions remain the same. For example, the deposition of the Nafion® ionomers on the electrode is conducted for 15 minutes, 30 minutes, 60 minutes and 180 minutes, respectively. The threshold voltage of each time period is 31.5 V, for example, and the voltage increases to an upper limit at about the same rate. The deposition of the ionomers is determined by analyzing the fluorine to carbon ratio (F/C) at various depths along the thickness of the catalyst layer of the electrode. In general, the F/C ratio at the surface of the catalyst layer of an untreated electrode (no deposition of ionomers has been performed on the electrode) is about 0.21, while the F/C ratio at the surface of the catalyst film of a treated electrode (deposition of Nafion® ionomers has been performed on the electrode) is greater than 0.5. The analysis results further indicate that the surface of the catalyst layer is fully and uniformly covered with the Nafion® ionomers even after 15 minutes of deposition. FIG. 3 is a graph showing the F/C ratio determined at various depths along the thickness of the carbon cloth (the catalyst layer of the electrode). As shown in FIG. 3, at the surface of the catalyst layer, the F/C ratios of the electrodes treated for 15-minute and 60-minute deposition are greater than the F/C ratio of the untreated electrode. Further, the F/C ratio at about 2.5 μm from the surface of the carbon cloth that has been treated for 15-minute deposition is higher than that of an untreated carbon cloth. For the electrode that has been subjected to 60-minute deposition, the F/C ratio is 0.31, indicating the presence of the ionomers even at the depth of 5 μm from the surface of the catalyst layer. These results of the F/C ratio analysis suggest that as the deposition time increases, the deposition occurs beyond the surface of the catalyst film. The ionomers deposited into the catalyst layer form ion channels inside the catalyst layer. The formation of such ion channels inside the catalyst layer not only enhances the catalytic efficiency, the ion channels will provide a continuous pathway for ions transport. Hence, ionic conduction can be greatly improved. These results further suggest that by properly adjusting the deposition time, the depth of deposition into the catalyst layer can be optimized.

Figure 4:
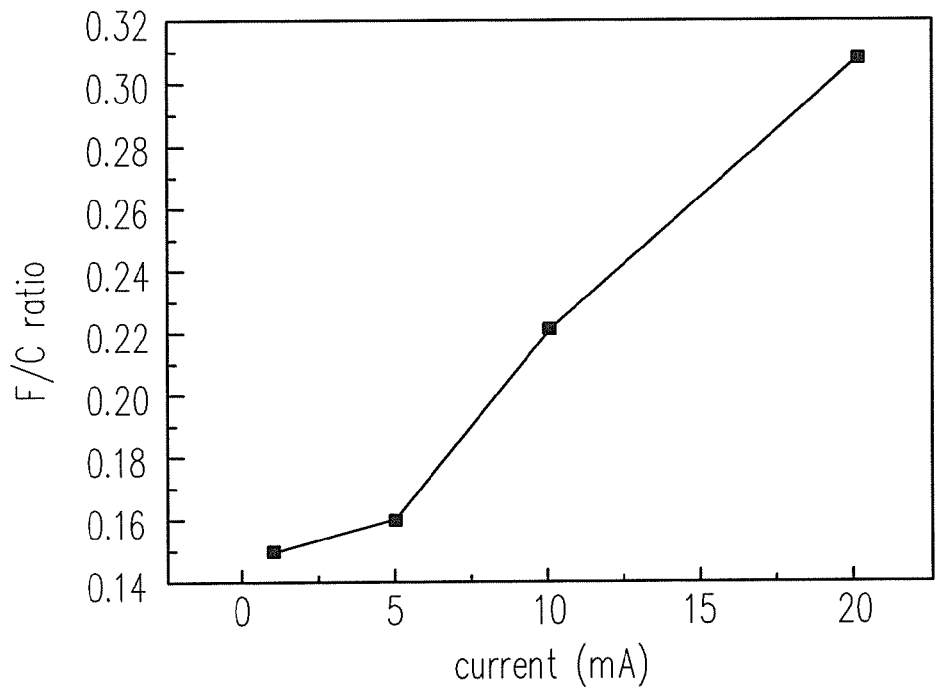
FIG. 4 is a graph showing the F/C ratios as a function of the applied current.

The effects of the applied current on the deposition of Nafion® ionomers to an electrode are also examined. In this embodiment of the invention, the applied current varies from 1 amp (300 minutes), 5 amp (60 minutes), 10 amp (30 minutes) and 20 amp (15 minutes), and the results, as shown in FIG. 4, indicate that increasing the current, the F/C ratio at the back of the electrode increases. These results also indicate that by increasing the current, not only the deposition rate of the Nafion® ionomers increases, the depth of deposition into the catalyst layer also increases. The depth of deposition of the ionomers is preferably controlled to be less than the thickness of the catalyst layer, which can be accomplished by optimizing, for example, the applied current, the deposition time, and other parameters in the deposition process.

Figure 5:
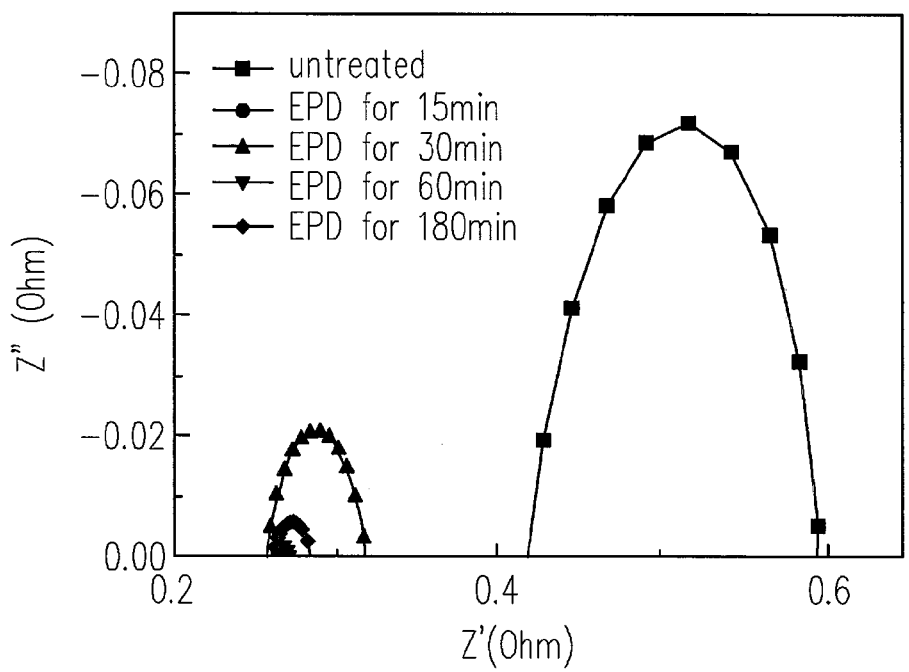
FIG. 5 is a diagram showing the AC impedance measurements of fuel cells with the electrode formed under different deposition time periods.

The AC impedances of the fuel cells with electrodes formed according to the above deposition method of the Nafion® ionomers are also examined. FIG. 5 is a diagram showing the AC impedance measurements of fuel cells with untreated electrodes and electrodes formed under different deposition time periods in this invention. Table 1 summarizes the values of the charge transfer resistance ($R_{ct}$) and the sum of the electrolyte resistance and the interface resistance ($R_m + R_{interface}$), which are determined from the diagram in FIG. 5. As illustrated in FIG. 5, the diameter of the semicircle for the fuel cell assembled with the untreated electrode (no deposition of Nafion® ionomers has been performed on the catalyst film of the electrode), is greater than those with electrodes that have being treated with deposition of Nafion® ionomers for the various deposition time periods. Further, the charge transfer resistance ($R_{ct}$) and the sum of the electrolyte resistance and the interface resistance ($R_m + R_{interface}$) for the untreated electrode are, in general, higher than those of the treated electrode. These results suggest that the deposition of the Nafion® ionomers via deposition method of this invention onto the surface and the interior of the catalyst layer may actually form continuous ionic channels for facilitating ion conduction, reducing the resistance of charge transfer and increasing the reaction area of the three-phase-boundary region. Further, a homo-junction between the electrode and the electrolyte membrane is resulted to reduce the contact resistance.

TABLE 1

| Time | $R_{ct}$ | $R_m + R_{interface}$ |
| --- | --- | --- |
| 0 min | 0.187 | 0.419 |
| 15 min | 0.011 | 0.265 |
| 30 min | 0.012 | 0.261 |
| 60 min | 0.033 | 0.261 |
| 180 min | 0.066 | 0.257 |

Figure 6:
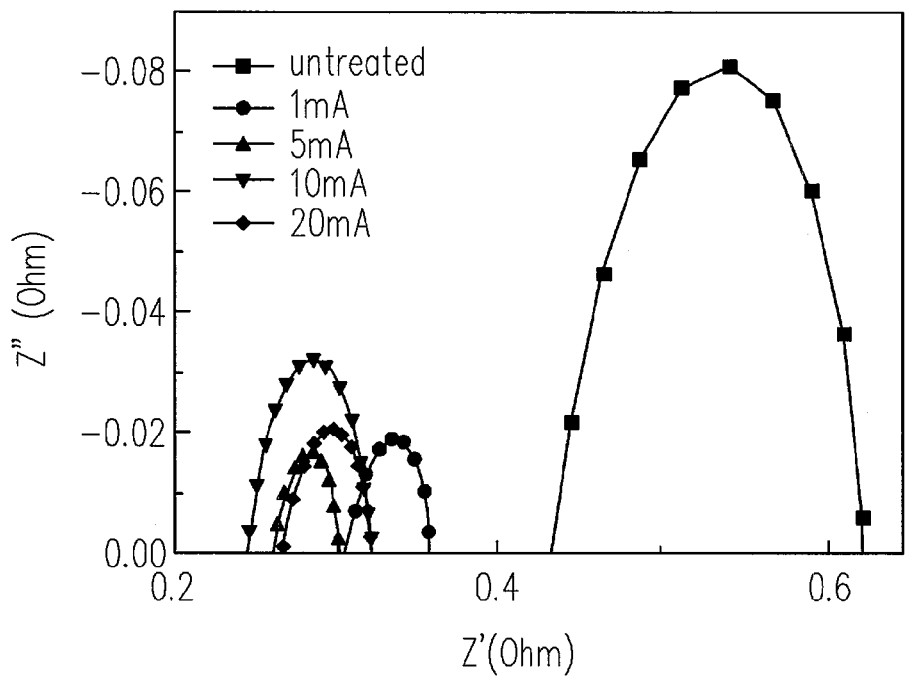
FIG. 6 is a diagram showing the AC impedance measurements of fuel cells with electrode formed under different applied currents in the deposition process.

Similar results are obtained when different currents are being applied during the deposition process of this invention. FIG. 6 is a diagram showing the AC impedance measurements of fuel cells with untreated electrodes and electrodes formed under different applied currents in the deposition process of this invention. Table 2 summarizes the values of the charge transfer resistance ($R_{ct}$) and the sum of the electrolyte resistance and the interface resistance ($R_m + R_{interface}$), determined from the AC impedance measurements. As shown in FIG. 6, the diameter of the semicircle for the fuel cell assembled with the untreated electrode (no deposition of Nafion® ionomers has been performed on the catalyst film of the electrode), is greater than those with electrodes that have being treated with deposition of Nafion® ionomers under various applied currents. Further, both the charge transfer resistance ($R_{ct}$) and the sum of the electrolyte resistance and the interface resistance ($R_m + R_{interface}$) of the cells with electrodes that have been subjected to deposition process of this invention are lower than those of the cells with the untreated electrodes. Hence, it can be concluded that the deposition of ionomers to the electrode reduces the charge transfer resistance.

TABLE 2

| Time | $R_{ct}$ | $R_m + R_{interface}$ |
|---|---|---|
| 0 min | 0.187 | 0.419 |
| 15 min | 0.042 | 0.299 |
| 30 min | 0.035 | 0.258 |
| 60 min | 0.072 | 0.243 |
| 180 min | 0.056 | 0.263 |

Figure 7:
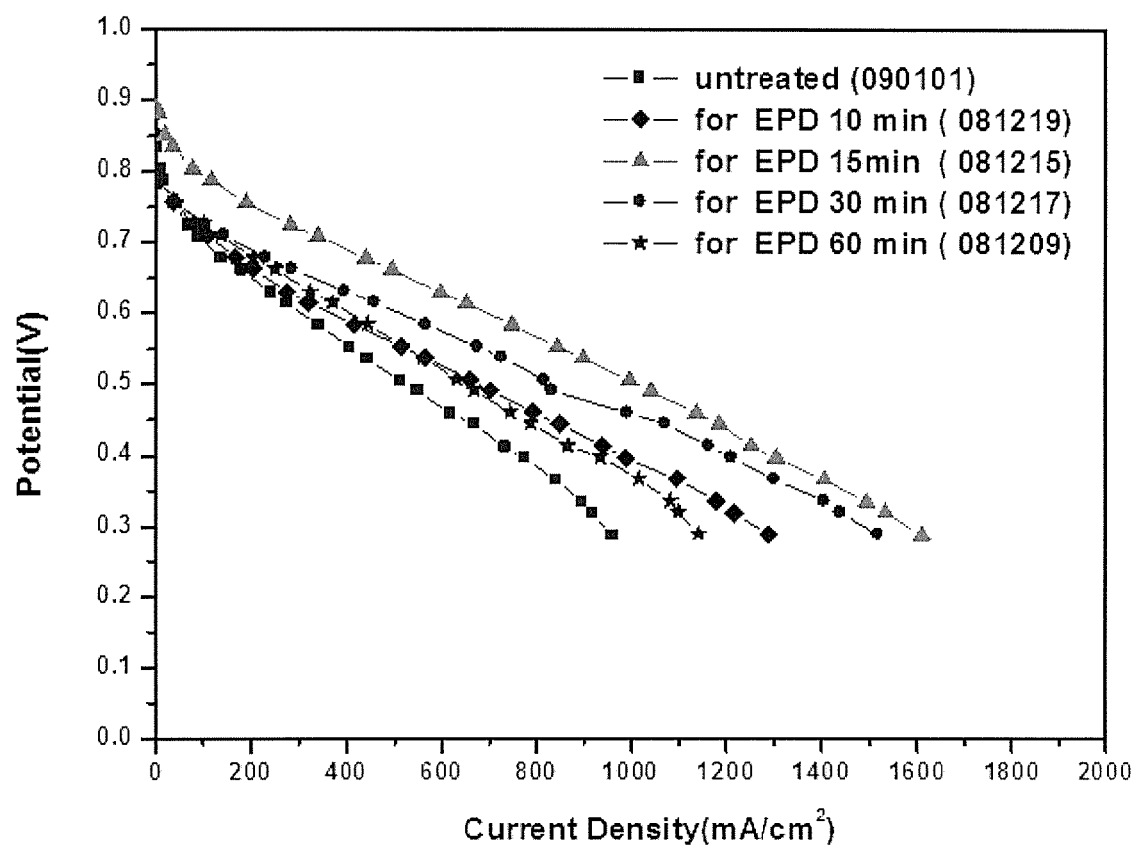
FIG. 7 is a diagram showing the performance of the MEA for the electrodes prepared by the deposition process in this invention was examined at 70° C. (pure hydrogen at anode side and pure oxygen at cathode side) and that of the electrode without deposition process in this invention.

The performance of the MEA for the electrodes prepared by the deposition process in this invention was examined at 70° C. (pure hydrogen at anode side and pure oxygen at cathode side) and compared with that of the electrode without deposition process in this invention (FIG. 7). Clearly, it shows improved performance for all the electrodes with this invention and reaches a maximum for the electrode of 15-minute deposition. It indicates formation of ionic channels by deposition of ionmers on the electrodes greatly improve the electrochemical active sites at the electrode/electrolyte interface, which results in better performance.

In accordance to the present invention, the electrode of a fuel cell is specially prepared by deposition of ionomers of this invention onto the surface and the interior of the catalyst layer. By means of the deposition method of this invention, the ionomers can be deposited, in a controlled manner, into a pre-determined depth of the catalyst layer. Hence, the reaction area of the three-phase-boundary region is increased and catalytic efficiency is enhanced. Moreover, the deposited ionomers may serve as ion channels to provide a continuous ionic conduction pathway, which can expedite ion conduction and improve the overall fuel cell efficiency. Further, via deposition method of this invention, the ionomers are uniformly deposited onto the surface of the catalyst layer. Accordingly, a homo-junction is formed between the electrode and the electrolyte membrane to substantially reduce the contact resistance.

In accordance to the electrode and a method of producing the same of the invention, the overall fuel cell efficiency can be improved by increasing the reaction area of the three-phase-boundary region, enhancing the catalytic efficiency, facilitating ionic conduction and reducing the contact resistance in the membrane electrode assembly.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. An electrode of an electrochemical device, comprising:
an electronic conductive layer;
a catalyst layer disposed on the electronic conductive layer, the catalyst layer having a front surface and a back surface, wherein the back surface is adjacent to the electronic conductive layer; and
a plurality of continuous ionic channels constituted with deposited ionomers and configured in the catalyst layer, wherein a fluorine to carbon ratio (F/C ratio) at the back surface of the catalyst layer increases as an applied current or a deposition time of the formation of the deposited ionomers increases.

2. The electrode of claim 1, wherein the deposited ionomers comprise a single type of ionomers.

3. The electrode of claim 1, wherein the deposited ionomers comprise a mixture of different types of ionomers.

4. The electrode of claim 1, wherein the catalyst layer comprises noble metals.

5. The electrode of claim 1, wherein the electronic conductive layer is a carbon-based or a metal-based material.

6. The electrode of claim 1, wherein the deposited ionomers comprise Nafion® (sulfonated tetrafluorethylene copolymer) ionomers.

7. The electrode of claim 1, wherein some of the plurality of the continuous ionic channels extends to the back surface of the catalyst layer.

8. The electrode of claim 1, wherein the deposited ionomers are at least uniformly distributed on the front surface of the catalyst layer.

9. A method for fabricating an electrode of a fuel cell of claim 1, comprising:
providing a catalyst-coated electronic conductive layer in between two chambers with a first electrode in an ionomer-containing solution and a second electrode in an ionomer-free solution;
applying a voltage between the first and the second electrodes; and
depositing ionomers onto the catalyst-coated electronic conductive layer.

10. The method of claim 9, wherein the applied voltage is fixed.

11. The method of claim 9, wherein the applied voltage varies.

12. The method of claim 9, wherein the applied voltage ranges from 0.001 Volt to 1000 Volt.

13. The method of claim 9, wherein the deposition time ranges from 1 second to 100,000 seconds.

14. The method of claim 9, wherein a solvent used in the ionomer-containing solution is able to disperse the ionomers.

15. The method of claim 9, wherein the ionomers comprise a single type of ionomers.

16. The method of claim 9, wherein the ionomers comprise a mixture of different types of ionomers.

17. The method of claim 9, wherein the ionomers comprise Nafion® (sulfonated tetrafluorethylene copolymer) ionomers.

18. The method of claim 9, wherein the catalyst-coated electronic conductive layer is a catalyst-coated carbon-based layer.

* * * * *